(12) United States Patent
Yamada et al.

(10) Patent No.: US 8,339,422 B2
(45) Date of Patent: Dec. 25, 2012

(54) IMAGE PROCESSING SYSTEM, INFORMATION PROCESSING APPARATUS, IMAGE PROCESSING METHOD AND PROGRAM

(75) Inventors: Rui Yamada, Kanagawa (JP); Takayuki Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 12/024,590

(22) Filed: Feb. 1, 2008

(65) Prior Publication Data
US 2008/0291221 A1 Nov. 27, 2008

(30) Foreign Application Priority Data
Feb. 26, 2007 (JP) .................. 2007-046132

(51) Int. Cl.
*G09G 5/00* (2006.01)
(52) U.S. Cl. ........................ 345/668; 345/649
(58) Field of Classification Search ........................ None
See application file for complete search history.

(56) References Cited

U.S. PATENT DOCUMENTS

| 5,818,967 | A * | 10/1998 | Bhattacharjee et al. | 382/233 |
| 7,594,027 | B1 * | 9/2009 | Cook | 709/241 |
| 2003/0122781 | A1 | 7/2003 | Koo | |
| 2003/0160890 | A1 * | 8/2003 | Caspe et al. | 348/372 |
| 2004/0015537 | A1 * | 1/2004 | Doerksen et al. | 709/203 |
| 2005/0216841 | A1 * | 9/2005 | Acker et al. | 715/730 |
| 2006/0012716 | A1 | 1/2006 | Choi | |
| 2006/0265643 | A1 * | 11/2006 | Saft et al. | 715/517 |
| 2007/0136685 | A1 * | 6/2007 | Bhatla et al. | 715/800 |
| 2008/0049111 | A1 * | 2/2008 | Choi | 348/220.1 |
| 2008/0184119 | A1 * | 7/2008 | Eyal et al. | 715/719 |
| 2010/0056127 | A1 * | 3/2010 | Osborne et al. | 455/418 |

FOREIGN PATENT DOCUMENTS

| JP | 11-196397 | 7/1999 |
| JP | 2002-016969 | 1/2002 |
| JP | 2002-341857 | 11/2002 |
| JP | 2004-145291 | 5/2004 |
| JP | 2005-017559 | 1/2005 |
| JP | 2005-293063 | 10/2005 |

* cited by examiner

Primary Examiner — James A. Thompson
Assistant Examiner — David H Chu
(74) Attorney, Agent, or Firm — Oblon, Spivak, McClelland, Maier & Neustadt, L.L.P.

(57) ABSTRACT

An information processing apparatus according to the present invention includes an acquisition unit that obtains from a terminal device equipped with a display screen attribute information including information indicating the directionality of the display screen, a detection unit that detects the size of a input image, an adjustment unit that adjusts the size of the input image so as to align the direction along which the longer side of the input image extends with the direction along which the longer side of the display screen extends based upon the information indicating the directionality of the display screen included in the attribute information, and a transfer unit that transfers the input image with the adjusted size to the terminal device.

16 Claims, 10 Drawing Sheets

IMAGE PROCESSING SYSTEM, INFORMATION PROCESSING APPARATUS, IMAGE PROCESSING METHOD AND PROGRAM

CROSS REFERENCES TO RELATED APPLICATIONS

The present invention contains subject matter related to Japanese Patent Application JP 2007-046132 filed in the Japan Patent Office on Feb. 26, 2007, the entire contents of which being incorporated herein by reference.

BACKGROUND OF THE INVENTION

1. Field of the Invention

The present invention relates to an image processing system, an information processing apparatus, an image processing method and a program.

2. Description of the Related Art

It has become the norm to mount a display screen at which text information, images and the like can be displayed at a terminal device such as a portable music player in recent years. In addition, display screens at which images can be displayed are mounted at terminal devices such as portable telephones and portable music players as well as portable personal computers, PDA (Personal Digital Assistant), digital cameras and portable still image/video viewers. With the technological progress made in recent years, larger display screens with sharply defined still and video images can now be displayed at the display screens of most terminal devices. However, the resolution in the display screen at a terminal device is lower than the resolution of images photographed with a digital still camera or the like. For this reason, the user of the terminal device first reduces the size of an image before transferring it to the terminal device or operate the terminal device so as to display a reduced image.

A method whereby an image reduction rate is set and images are reduced at an uniform rate (relative setting) has been proposed in order to reduce the labor used for image transfer or in the terminal device operation described above. However, since the size of the reduced image is determined in conformance to the size of the original image in this method, the reduced image size may not achieve a suitable fit the size of the display screen.

Another method whereby the user sets the width and height of the reduced image to be used for reduced image display (absolute setting) has been proposed as alternative measures for reducing the labor of the image transfer or the terminal device operation. However, while this method allows the user to set an image size suitable for the resolution of the display screen, there may be images that are not reduced to the suitable size depending upon the shape of the display screen. For instance, when displaying a longitudinally oriented image at a terminal device equipped with a laterally oriented display screen, the height of the image will be reduced in conformance to the height of the display screen. The size of the image thus reduced is bound to be exceedingly small, with large margins (hereafter referred to as black strips or a non-display area) formed to the left and the right of the reduced image displayed at the display screen (see FIG. 13). In other words, the number of effective pixels constituting the reduced image will be much smaller than the number of pixels available at the display screen.

JP 2005-293063 A, for instance, discloses a technology related to the method described above, whereby an image is displayed in an enlargement or in a reduced size at a terminal device so that the entire image is contained within the display screen. When, for instance, an image stored in a terminal device such as a portable telephone is too large to be displayed in full in the display screen, this technology may be adopted to display the image by reducing it to a size small enough to be contained in the display screen.

SUMMARY OF THE INVENTION

A user may want a function that allows an image, having been transferred and received from an information processing apparatus by engaging a function of a given terminal device, to be automatically rotated and displayed so as to match the directionality of the display screen based upon judgment made with regard to the directionality of the image. By using such of function, the user will be able to align the direction along which the longer side of the image extends with the direction along which the longer side of the display screen extends.

However, if the directionality of the display screen and the directionality of the image are different, the user will not be able to easily reduce the image to the suitable size for the display screen at the terminal device, no matter how the technologies described above may be combined. For instance, if an image having been reduced through absolute setting is received and rotated so as to match the directionality of the image with the directionality of the display screen, the size of the reduced image with a smaller number of pixels will be enlarged to fill the display screen and thus, the image brought up on display will be coarse. In other words, even if the terminal device has an automatic image rotation function, it is difficult to be utilized to full advantage unless the size of an image transferred to the terminal device is adjusted to the suitable size for the display screen at the terminal device.

Accordingly, the present invention, having been completed by addressing the issues discussed above, provides a new and improved image processing system, a new and improved information processing apparatus, a new and improved image processing method and a new and improved program with which an image having the size thereof optimized for a display screen is transferred by matching the directionality of the display screen and the directionality of the image to be displayed at the display screen.

According to an embodiment of the present invention, there is provided an image processing system including a terminal device equipped with a display screen at which an image is displayed and an information processing apparatus connected to the terminal device and capable of transferring an input image after adjusting the size thereof so as to optimize the input image for the display screen.

The terminal device constituting the image processing system includes a transfer unit that transfers to the information processing apparatus attribute information including information indicating the directionality of the display screen and information related to the size of the display screen.

In addition, the information processing apparatus constituting the image processing system includes an acquisition unit that obtains the attribute information from the terminal device, a detection unit that detects the size of the input image, an adjustment unit that adjusts the size of the input information so as to align the direction along which the longer side of the input image extends with the direction along which the longer side of the display screen extends based upon the information indicating the directionality of the display screen included in the attribute information, and a transfer unit that transfers the input image with the adjusted size to the terminal device.

The transfer unit in the terminal device transfers to the information processing apparatus the attribute information, which includes information indicating the directionality of the display screen and the information related to the display screen size. The acquisition unit in the information processing apparatus obtains the attribute information from the terminal device. The detection unit detects the size of the input image. The adjustment unit adjusts the size of the input image so as to align the direction along which the longer side of the input image extends with the direction along which the longer side of the display screen extends based upon the information indicating the directionality of the display screen, which is part of the attribute information. The transfer unit then transfers the input image with the adjusted size to the terminal device.

The system described above enables the user to match the directionality of the image to be brought up on display at the display screen with the directionality of the display screen, regardless of the directionality of the display screen at the terminal device, e.g., longitudinally oriented, laterally oriented or the like and ultimately, an image with the suitable resolution for the particular display screen can be generated.

According to another embodiment of the present invention, there is provided an information processing apparatus including an acquisition unit that obtains from a terminal device equipped with a display screen attribute information including information indicating the directionality of the display screen, a detection unit that detects the size of an input image, an adjustment unit that adjusts the size of the input image so as to align the direction along which the longer side of the input image extends with the direction along which the longer side of the display screen extends based upon the information indicating the directionality of the display screen included in the attribute information, and a transfer unit that transfers the input image with the adjusted size to the terminal device.

The acquisition unit in the information processing apparatus obtains the attribute information, which includes information indicating the directionality of the display screen at the terminal device. The detection unit detects the size of the input image. The adjustment unit adjusts the size of the input image so as to align the direction along which the longer side of the input image extends with the direction along which the longer side of the display screen extends based upon the information indicating the directionality of the display screen, which is part of the attribute information. The transfer unit then transfers the input image with the adjusted size to the terminal device.

The apparatus described above enables the user to match the directionality of the image to be brought up on display at the display screen with the directionality of the display screen, regardless of the directionality of the display screen at the terminal device, e.g., longitudinally oriented, laterally oriented or the like and ultimately, an image with the suitable resolution for the particular display screen can be generated.

In addition, the adjustment unit may adjust the longer side or the shorter side of the input image in conformance to the measurement of the longer side or the shorter side of the display screen so as to display the entire input image in the display screen.

If the attribute information includes information indicating the orientation of the display screen, the adjustment unit may adjust the size of the input image so that the orientation of the display screen and the orientation of the input image match.

The acquisition unit may also obtain information indicating a display mode selected at the terminal device as the attribute information. In such a case, the adjustment unit may adjust the size of the input image based upon the display mode information.

The transfer unit may also transfer to the terminal device information indicating the orientation of the input image with the adjusted size as well.

The adjustment unit may adjust the size of the input image based upon the aspect ratio of the display screen and the aspect ratio of the input image while maintaining the aspect ratio of the input image.

According to another embodiment of the present invention, there is provided an image processing method to be adopted in an information processing apparatus. The image processing method includes an acquisition step in which attribute information including information indicating the directionality of a display screen is obtained from a terminal device equipped with the display screen, a detection step in which the size of an input image is detected, an adjustment step in which the size of the input image is adjusted so as to align the direction along which the longer side of the input image extends with the direction along which the longer side of the display screen extends based upon the information indicating the directionality of the display screen included in the attribute information and a transfer step in which the input image with the adjusted size is transferred to the terminal device.

In the adjustment step, the measurement of the input image along the longer side or the shorter side may be adjusted in conformance to the longer side or the shorter side of the display screen so that the entire input image is displayed in the display screen.

In addition, if the attribute information includes information indicating the orientation of the display screen, the size of the input image may be adjusted so that the orientation of the display screen and the orientation of the input image match in the adjustment step.

In the acquisition step, information indicating a display mode selected at the terminal device may be obtained as the attribute information. In such a case, the size of the input image may be adjusted based upon the display mode information in the adjustment step.

In the transfer step, information indicating the orientation of the input image with the adjusted size may also be transferred to the terminal device.

In the adjustment step, the size of the input image may be adjusted based upon the aspect ratio of the display screen and the aspect ratio of the input image while maintaining the aspect ratio of the input image.

According to another embodiment of the present invention, there is provided a program enabling a computer to fulfill an acquisition function of obtaining attribute information that includes information indicating the directionality of a display screen from a terminal device equipped with the display screen, a detection function of detecting the size of an input image, an adjustment function of adjusting the size of the input image so as to align the direction along which the longer side of the input image extends with the direction along which the longer side of the display screen extends based upon the information indicating the directionality of the display screen included in the attribute information and a transfer function of transferring the input image with the adjusted size to the terminal device. The present invention also provides a computer-readable recording medium having recorded therein the program.

Through the adjustment function, the measurement of the input image along the longer side or the shorter side may be adjusted in conformance to the longer side or the shorter side of the display screen so that the entire input image is displayed in the display screen.

In addition, if the attribute information includes information indicating the orientation of the display screen, the size of the input image may be adjusted so that the orientation of the display screen and the orientation of an input image match through the adjustment function.

Through the acquisition function, information indicating a display mode selected at the terminal device may be obtained as the attribute information. In such a case, the size of the input image may be adjusted based upon the display mode information through the adjustment function.

Through the transfer function, information indicating the orientation of the input image with the adjusted size may also be transferred to the terminal device.

Through the adjustment function, the size of the input image may be adjusted based upon the aspect ratio of the display screen and the aspect ratio of the input image while maintaining the aspect ratio of the input image.

When the display screen at a terminal device has directionality, the system, the apparatus, the method and the program described above allow the user to match the directionality of an image to be displayed at the display screen with the directionality of the display screen and, as a result, an image with the suitable resolution level for the particular display screen can be generated. For instance, the user may adjust the size of the image so as to display the entire image by aligning the direction along which the longer side of the image extends with the direction along which the longer side of the display screen extends while maintaining the aspect ratio of the image. In this case, the wasted area in the display screen that are not used for image display can be minimized. Namely, a resolution level close to the resolution of the display screen can be achieved.

While an image larger than the display screen may be transferred to the terminal device to be reduced at the terminal device so as to assure a higher level of resolution, the image transfer load and the image transfer time are both bound to increase significantly. From this viewpoint, the system, the apparatus, the method and the program described above also achieve an advantage in that the image transfer load/transfer time are reduced in relative terms, while sustaining the suitable resolution for the display screen.

This point is explained in further detail. As explained earlier, the applicant of the present invention has proposed a technology to be adopted when determining the correct scaling factor by aligning the direction along which the longer side of the image extends with the direction along which the longer side of the display screen extends. This technology may relate to an information processing apparatus including, for instance, a reception unit that receives from another information processing apparatus or a terminal device attribute information which includes information indicating the directionality of a display screen at the other information processing apparatus or terminal device, a detection unit that detects the image size of an input image, an adjustment unit that adjust the size of the image so as to align the direction along which the longer side of the image extends with the direction along which the longer side of the display screen extends when the attribute information received by the reception unit includes information indicating that the display screen has directionality and a transmission unit that transmits the image with the size thereof having been adjusted by the adjustment unit to the terminal device.

The adjustment unit may adjust the size of the image by aligning the longer side or the shorter side of the image along the longer side or the shorter side of the display screen so as to display the whole image. When information indicating the orientation of the display screen has been received as the attribute information, the adjustment unit may adjust the size of the image by matching the orientation of the image with the orientation of the display screen. If information indicating a display mode selected at the terminal device has been received at the reception unit, the adjustment unit may adjust the size of the image based upon the display mode. In addition, the transmission unit may transmit information indicating the orientation of the image.

According to the embodiments of the present invention described above, an image can be transferred with the size thereof adjusted so as to optimize the image for a display screen by matching the directionality of the image to be displayed at the display screen with the directionality of the display screen. As a result, the image can be displayed with the suitable resolution in a display screen with a directionality.

DETAILED DESCRIPTION OF THE PREFERRED EMBODIMENTS

Figure 1:
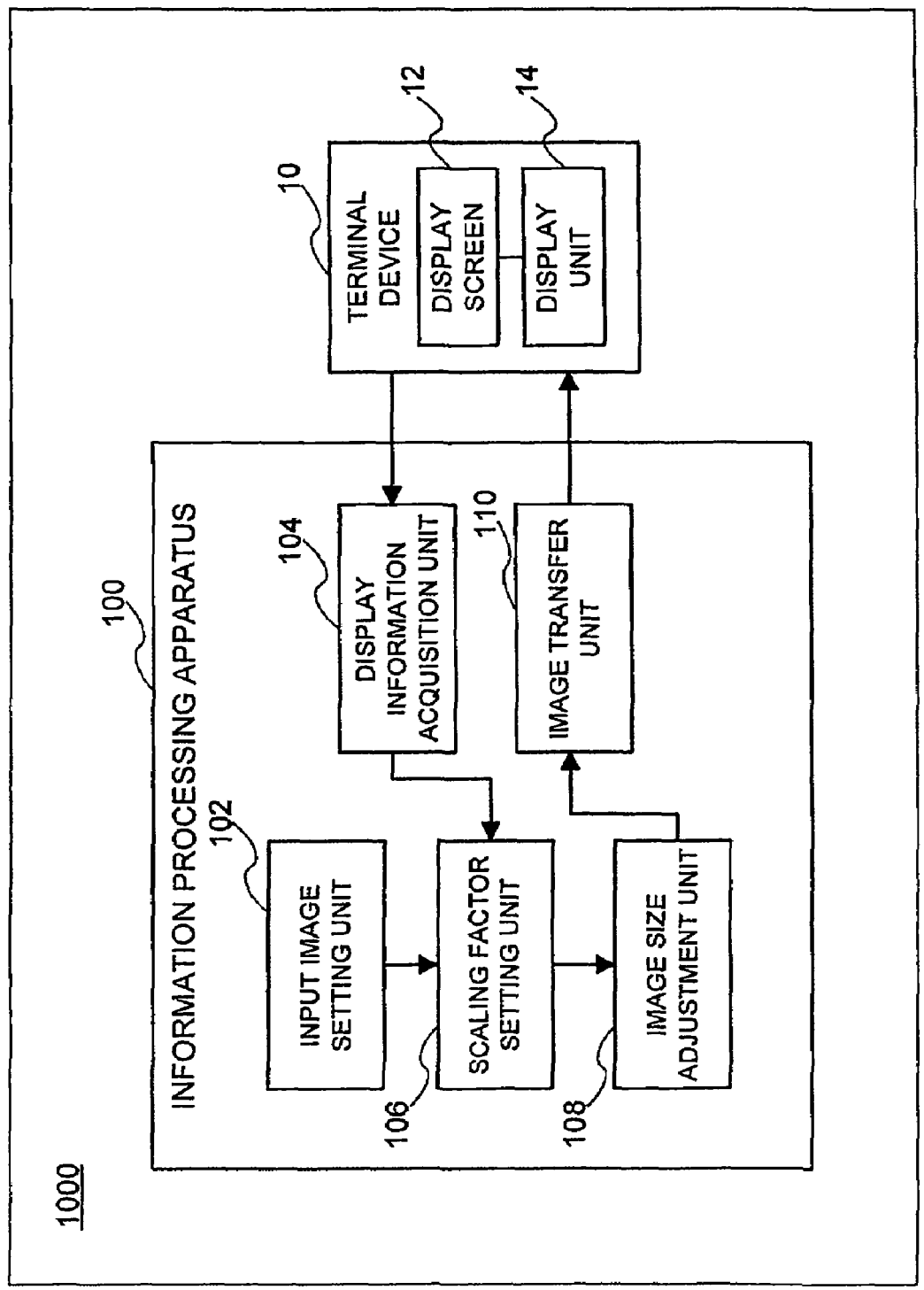
FIG. 1 illustrates the structure adopted in the image processing system in an embodiment of the present invention.

Hereinafter, a preferred embodiment of the present invention will be described in detail with reference to the appended drawings. Note that, in this specification and the appended drawings, structural elements that have substantially the same functions and structures are denoted with the same reference numerals, and repeated explanation of these structural elements is omitted.

(Description of Comparable Technologies)

Figure 13:
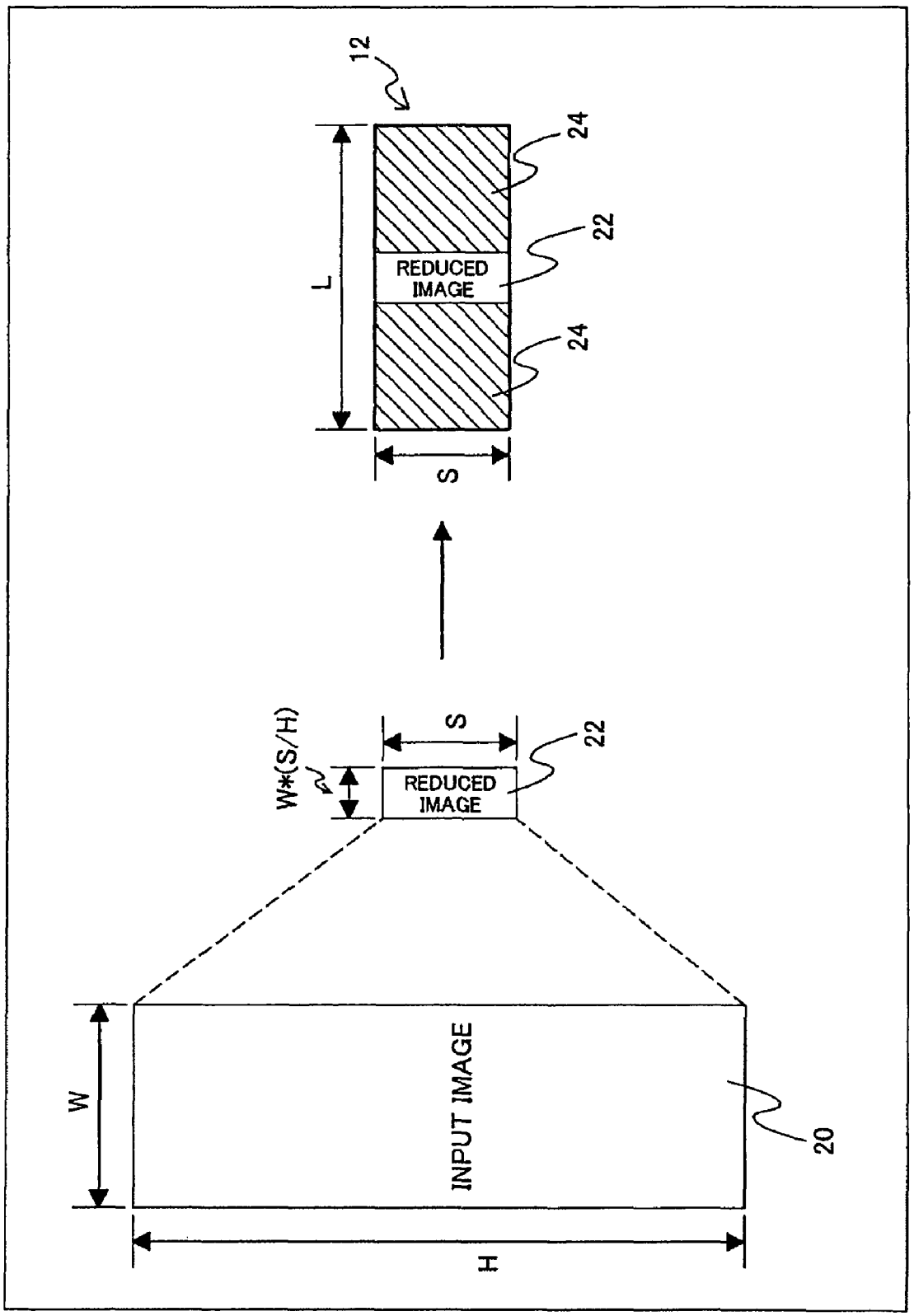
FIG. 13 illustrates an example of an image reduction method.

Before describing an embodiment of the present invention, an example of an image reduction method representing a technology comparable to that adopted in the embodiment is briefly explained in reference to FIG. 13 so as to better clarify the features of the present invention. FIG. 13 presents an example of an image reduction method.

FIG. 13 shows an input image 20, a reduced image 22, a display screen 12 and non-display areas 24. The input image 20, which is the original image based upon which an image to be transferred from an information processing apparatus to a terminal device, is generated, assumes a width W and a height H. The reduced image 22, which is the image transferred from the information processing apparatus to the terminal device, assumes a width W*(S/H) and a height S. The display screen 12, which is mounted at the terminal device, assumes a width L and a height S. The non-display areas 24 are areas displayed as blank areas or black strips when the reduced image 22 transferred from the information processing apparatus is brought up on display at the display screen 12.

FIG. 13 shows a step in which the information processing apparatus having received information indicating the width L and the height S from the terminal device, reduces the input image 20 based upon the absolute setting and a step in which the reduced image 22 received from the information processing apparatus is brought up on display at the display screen 12. The input image 20 is reduced so as to match the height of the display screen 12 while maintaining the aspect ratio, with its height reduced to S and its width reduced to W*(S/H). As a result, significant non-display areas 24 together ranging over a width (L−W*(S/H)) are formed at the display screen 12. Even if the terminal device has an automatic image rotation function and the image is displayed in the largest size to fit within the display screen 12, the reduced image 12, which will be enlarged by a factor of (L/S) or (H/W) under such circumstances, will become coarse.

(Embodiment of the Invention)

Bearing in mind the issues to be addressed in the comparable art described above, the system configuration of an image processing system 1000, the functional structure of an information processing apparatus 100 and the image processing method achieved in the embodiment of the present invention are now explained.

(System Configuration of the Image Processing System 1000)

In reference to FIG. 1, the system configuration of the image processing system 1000 achieved in the embodiment is explained. FIG. 1 illustrates the system configuration adopted in the image processing system 1000 in the embodiment.

As shown in FIG. 1, the image processing system 1000 includes, as its primary components, the information processing apparatus 100 and a terminal device 10. The terminal device 10, in turn, includes as its primary components a display screen 12 and a display unit 14 and is capable of transferring attribute information related to the display screen 12 to the information processing apparatus 100. The attribute information may be made up with, for instance, information indicating the directionality of the display screen 12, information related to the size of the display screen 12, information related to an image rotation function and information related to a display mode. The terminal device 10 further includes a transfer unit (not shown) that transfers the attribute information to the information processing apparatus 100. Based upon the attribute information obtained from the terminal device 10, the information processing apparatus 100 adjusts the size of an input image and transfers the image with the adjusted size to the terminal device 10.

(Hardware Structure)

An example of a hardware structure that may be adopted in the information processing apparatus 100 is briefly described. The information processing apparatus 100 may basically include a CPU (central processing unit), a ROM (read only memory), a RAM (random access memory), an output unit, a storage unit, a drive, a connector port and a communication unit.

The CPU, which may function as, for instance, an arithmetic processing device or a control device, is capable of controlling operations executed in the information processing apparatus 100 based upon various programs recorded in the ROM, the RAM, the storage unit or another recording medium. In the ROM, programs and the like utilized by the CPU can be stored. Various programs or information can be temporarily or permanently stored in the RAM.

The output unit is a display device constituted with, for instance, a CRT (cathode ray tube), a LCD (liquid crystal display), a PDP (plasma display panel), an ELD (electroluminescence display) or the like, at which visual display of the input image, information having been obtained or the like can be brought up.

The storage unit may be constituted with, for instance, a magnetic storage device such as an HDD (hard disk drive), a semiconductor storage device, an optical storage device or a magneto-optical storage device. A program to be executed by the CPU, the input image, the attribute information having been obtained or the like can be stored into the storage unit.

The drive reads out/writes information from/into a recording medium such as a magnetic disk, an optical disk, a magneto-optical disk or a semiconductor memory. The recording medium may be a DVD medium, an HD-DVD medium, a Blu-ray medium, a CompactFlash (CF), a memory stick or an SD (secure digital) memory card.

The connector port is an external interface constituted with, for instance, a USB (universal serial bus) port, an IEEE 1394 port, a SCSI (small computer system interface) or an RS-232C port. Connection with a portable music player, a printer, a digital camera, a digital video camera, an IC recorder or the like can be achieved via the connector port. Namely, the information processing apparatus 100 is able to obtain the attribute information or the like from, and transfer an image to, any of various types of terminal device 10 that may be connected thereto via the connector port.

The communication unit is a communication device connected to a communication network, which may be constituted with a communication card for a wired or wireless LAN (local area network) Bluetooth or WUSB (wireless USB), an optical communication router, an ADSL (asymmetric digital subscriber line) router or any of various types of communication modems. The communication network is a network connected through a wired connection or a wireless connection, which may be the Internet, an in-home LAN, an infrared communication network, a broadcast network or a satellite communication network.

(Attribute Information)

The attribute information is now briefly explained. As described earlier, the attribute information may include information indicating the directionality of the display screen 12, information related to the size of the display screen 12, information related to the image rotation function and information related to the display mode. The information indicating that directionality of the display screen 12 is constituted with some of or all of the following; information indicating whether the size of the display screen 12 is indicated based upon its longer side/shorter side measurement or based upon its width and height, information indicating whether the display screen 12 assumes a shape with no directionality, e.g., a square or a circle, or a shape assuming a specific directionality such as a longitudinally-elongated shape or a laterally elongated shape, e.g., a rectangle, information indicating the direction extending along the longer side or the shorter side of the display screen 12 and information indicating the longitudinal direction and the lateral direction with regard to the display screen 12, as distinct from each other (a specific orientation assumed for the display screen).

The information related to the size of the display screen 12 may include information indicating the lengths of the longer side and the shorter side of the display screen 12, information indicating the width and height (the distance measured along the lateral direction and the distance measured along the longitudinal direction) of the display screen or the like. The information related to the image rotation function may include information indicating whether or not a function of automatically rotating the target information so as to substantially align the direction along which the longer side of the display screen 12 extends with the direction along which the longer side of the image extends, is available, information indicating the on/off state of the function, and the like. The information related to the display mode may include information indicating the display mode currently selected at the display unit 14 among a display mode in which a fixed setting is selected so as to use the display screen 12 as a longitudinally oriented screen, a display mode in which a fixed setting is selected so as to use the display screen 12 as a laterally oriented screen, a display mode in which the image is automatically rotated in correspondence to the directionality of the image and the like.

(Functional Structure of the Image Information Processing Apparatus 100)

Next, in reference to FIG. 1, the functional structure adopted in the information processing apparatus 100 in the embodiment is explained.

As shown in FIG. 1, the primary components constituting the information processing apparatus 100 are; an input image setting unit 102, a display information acquisition unit 104, a scaling factor setting unit 106, an image size adjustment unit 108 and an image transfer unit 110. It is to be noted that some of or all of the functions that can be fulfilled via the input image setting unit 102, the scaling factor setting unit 106 and the image size adjustment unit 108 may actually be provided via the CPU or the like mentioned earlier based upon specific programs or they may be provided in dedicated hardware.

(Input Image Setting Unit 102)

The input image setting unit 102 is a device that sets information related to the size of an input image to be transferred to the terminal device 10. The input image setting unit 102 may detect the width W and the height H of the original input image and then may set the detected width and height as information indicating the size and directionality of the input image. In addition, the input image setting unit 102 may rotate the input image. In such a case, the input image setting unit 102 should detect the width W and the height H of the rotated input image and set the detection results as the information indicating the size and directionality of the input image. The information indicating the directionality of the input image should include, for instance, information indicating the direction extending along the longer side or the shorter side of the input image or information indicating the orientation (longitudinal/lateral direction) of the input image. The input image setting unit 102 is thus able to set the width W and the height H to be referenced as parameters when the size of the input image is adjusted. It is to be noted that the input image setting unit 102 represents an example of the detection unit.

(Display Information Acquisition Unit 104)

The display information acquisition unit 104 is a device that obtains the attribute information related to the display screen 12 at the terminal device 10. The display information acquisition unit 104 is capable of obtaining some of or all of the various types of information included in the attribute information explained earlier. For instance, the display information acquisition unit 104 may obtain information related to the directionality of the display screen 12, information related to the size of the display screen 12 and information related to the image rotation function. It is to be noted that the display information acquisition unit 104 represents an example of the acquisition unit.

(Scaling Factor Setting Unit 106)

The scaling factor setting unit 106 sets a scaling factor 'a' at which the size of the input image is to be adjusted based upon the attribute information obtained by the display information acquisition unit 104. The scaling factor setting unit 106 makes a decision as to whether the information related to the size of the display screen 12 indicates the longer side L/shorter side S of the display screen 12 or the width X/height Y of the display screen 12. The scaling factor setting unit 106 then sets the scaling factor 'a' suitable for the display screen 12 based upon the information related to the size of the display screen 12 (longer side L/shorter side S or width X/height Y) and the information indicating the width W and the height H of the input image. During this operation, the scaling factor setting unit 106 select the suitable scaling factor 'a' for the display screen 12 by maintaining the aspect ratio of the input image. It is to be noted that the scaling factor setting unit 106 is a device engaged in operation to fulfill some of the functions of the adjustment unit.

(Image Size Adjustment Unit 108)

The image size adjustment unit 108 adjusts the size of the input image based upon the scaling factor 'a' having been set by the scaling factor setting unit 106. In order to maintain the aspect ratio of the input image, the image size adjustment unit 108 determines the width W*a and the height H*a to be achieved for the reduced image by multiplying the width W and the height H of the input image by the scaling factor a. It is to be noted that the image size adjustment unit 108 is a device engaged in operation to fulfill some of the functions of the adjustment unit.

(Image Transfer Unit 110)

The image transfer unit 110 transfers the input image, the size of which has been adjusted by the image size adjustment unit 108 to the terminal device 10. The image transfer unit 110, which simply needs to be able to transfer an image to the terminal device 10, may be constituted with, for instance, a USB device, an IEEE 1394 device, a wired/wireless LAN device, an infrared communication device or another type of communication device.

(Specific Examples)

In reference to FIGS. 2 through 7, specific examples of the processing executed by the scaling factor setting unit 106 to set the scaling factor 'a' and the processing executed by the image size adjustment unit 108 to adjust the image size are explained. It is to be noted that W and H represent the width and the height of the input image, whereas L and S represent the longer side and the shorter side of the display screen 12 (X and Y respectively represent the width and height of the display screen).

Figure 7:
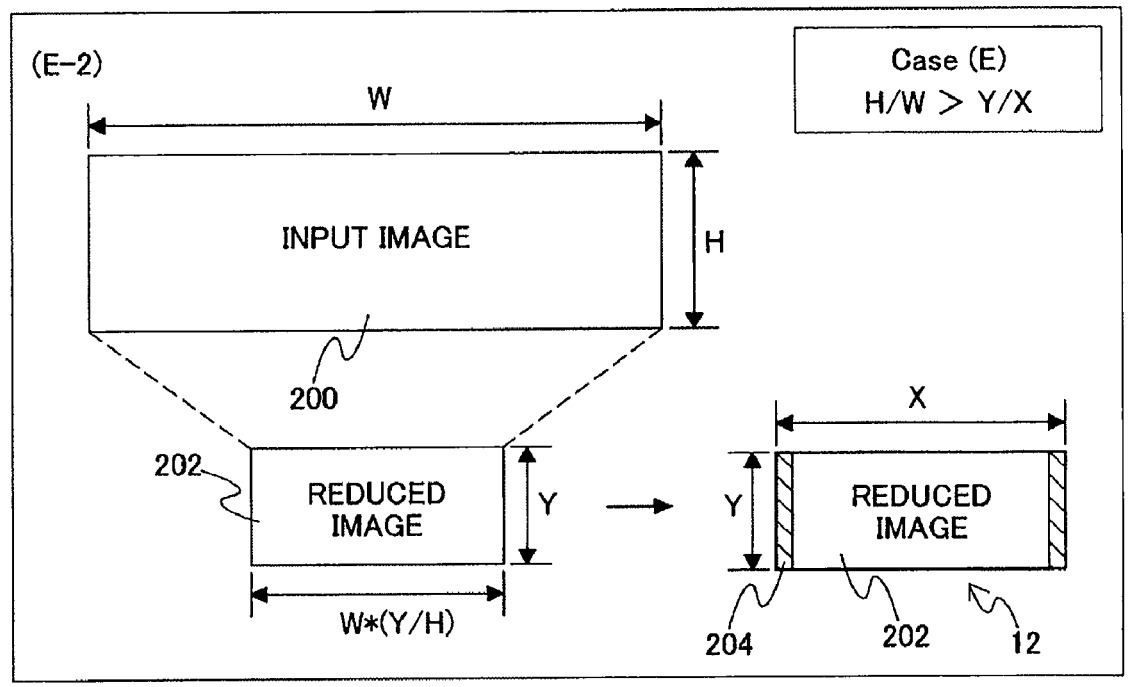
FIG. 7 illustrates an image reduction method adopted in the embodiment.
Figure 8:
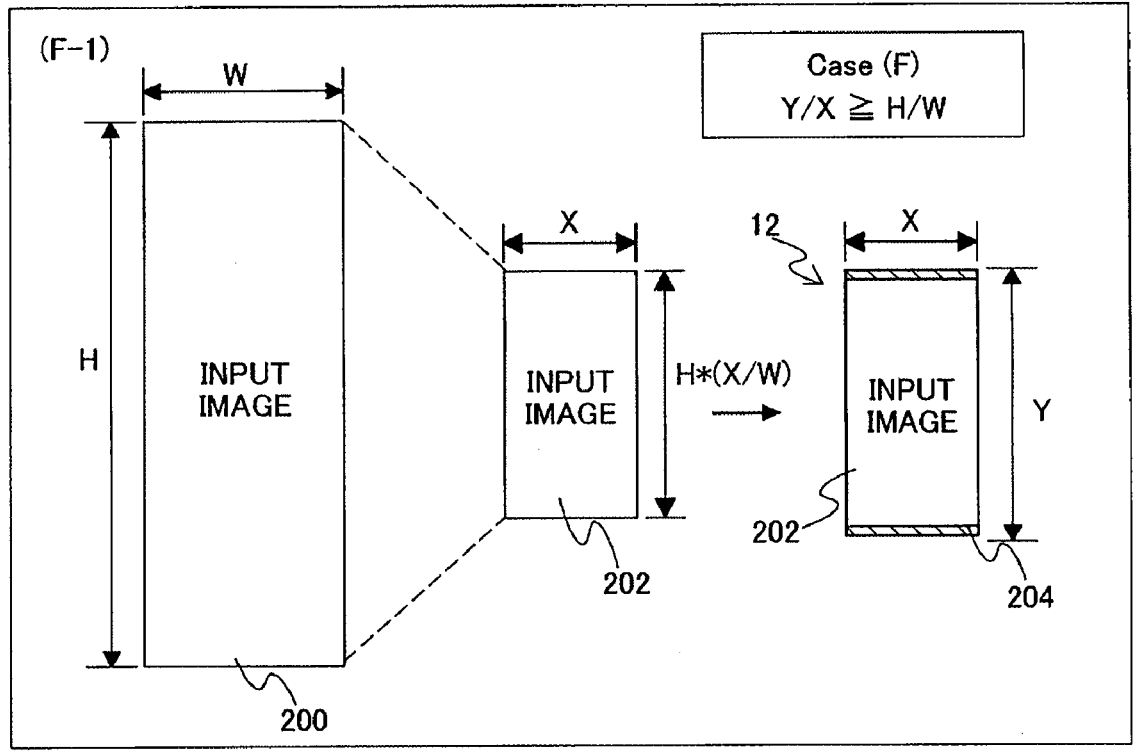
FIG. 8 illustrates an image reduction method adopted in the embodiment.

FIGS. 2 through 5 illustrate processing executed for a terminal device 10 that supports the image rotation function, whereas FIGS. 7 and 8 illustrate processing executed for a terminal device 10 that does not support the image rotation function. As explained earlier, terminal devices 10 include those that come with an image rotation function for automatic image rotation and those that do not. In addition, terminal devices 10 include those with a function of responding to an inquiry related to the functions of the display unit 14 received from the information processing apparatus 100 (hereafter referred to as a photo capability) and those that do not. A terminal device with the photo capability is able to respond by transmitting the information related to the size of the display screen 12, indicating the (longer side/shorter side) or the (width/height). The (longer side/shorter side) information is obtained from a terminal device with the image rotation function, whereas the (width/height) information is obtained from a terminal device that is not equipped with the image rotation function. It is to be noted that FIGS. 2 through 5 represent an example in which the (longer side/shorter side) information has been obtained and that FIGS. 7 and 8 represent an example in which the (width/height) information has been obtained.

Figure 2:
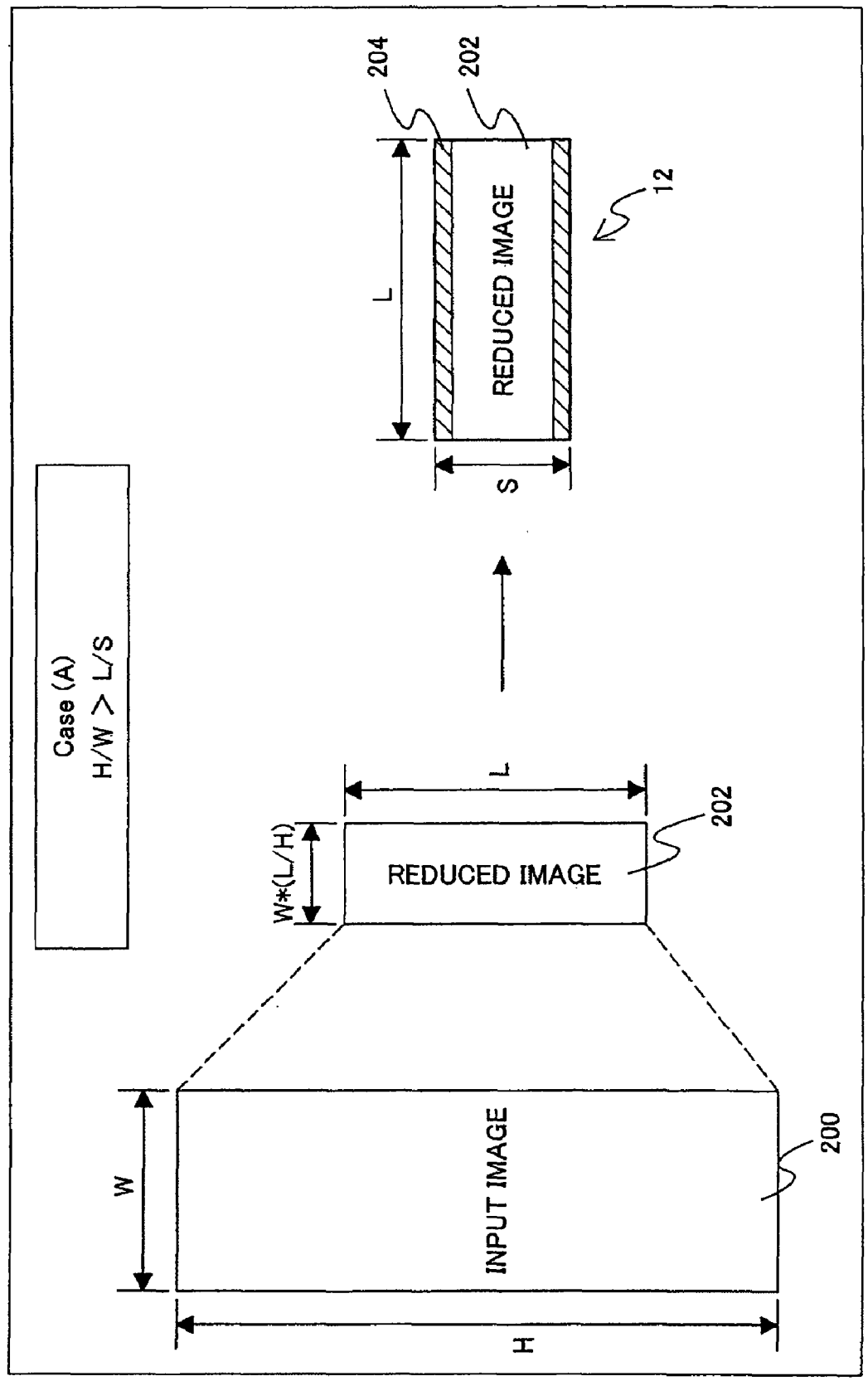
FIG. 2 illustrates an image reduction method adopted in the embodiment.

(FIG. 2: Case (A))

First, in reference to FIG. 2, the processing executed when H/W>L/S (hereafter referred to as case (A)) is explained. FIG. 2 illustrates an image reduction method that may be adopted in case (A).

FIG. 2 shows an input image 200, a reduced image 202, the display screen 12 and non-display areas 204. The input image 200, which is the original image based upon which an image to be transferred from the information processing apparatus 100 to a terminal device 10 is generated, assumes the width W and the height H. The reduced image 202, which is the image transferred from the information processing apparatus 100 to the terminal device 10, assumes a width W*(L/H) and a height L. The display screen 12, which is mounted at the terminal device 10, assumes a longer side L and a shorter side S. The non-display areas 204 are areas displayed as blank areas or black strips when the reduced image 202 transferred from the information processing apparatus 100 is brought up on display at the display screen 12.

The scaling factor setting unit 106 first compares the aspect ratio H/W of the input image 200 with the aspect ratio L/S of the display screen 12. The scaling factor setting unit 106 then sets a scaling factor 'a'=L/H upon judging that H/W>L/S. Namely, judging that the input image 200 assumes a more elongated shape than the display screen 12, the scaling factor setting unit 106 sets the scaling factor 'a' in reference to the longer side L so that the height of the reduced image 202 is set to L. Once the scaling factor is set, the scaling factor setting unit 106 sets the height and the width of the reduced image 202 respectively to L and W*(L/H). Subsequently, the image size adjustment unit 108 adjusts the size of the input image 200 at the scaling factor 'a' having been set by the scaling factor setting unit 106 so that the adjusted image assumes the height L and the width W*(L/H) set for the reduced image 202.

Through the processing described above, the reduced image 202 is generated in a size suitable for the display screen 12 with reduced non-display areas 204 under conditions defined as case (A). The superior effect of the processing is made very clear when compared with the processing executed as shown in FIG. 13.

Figure 3:
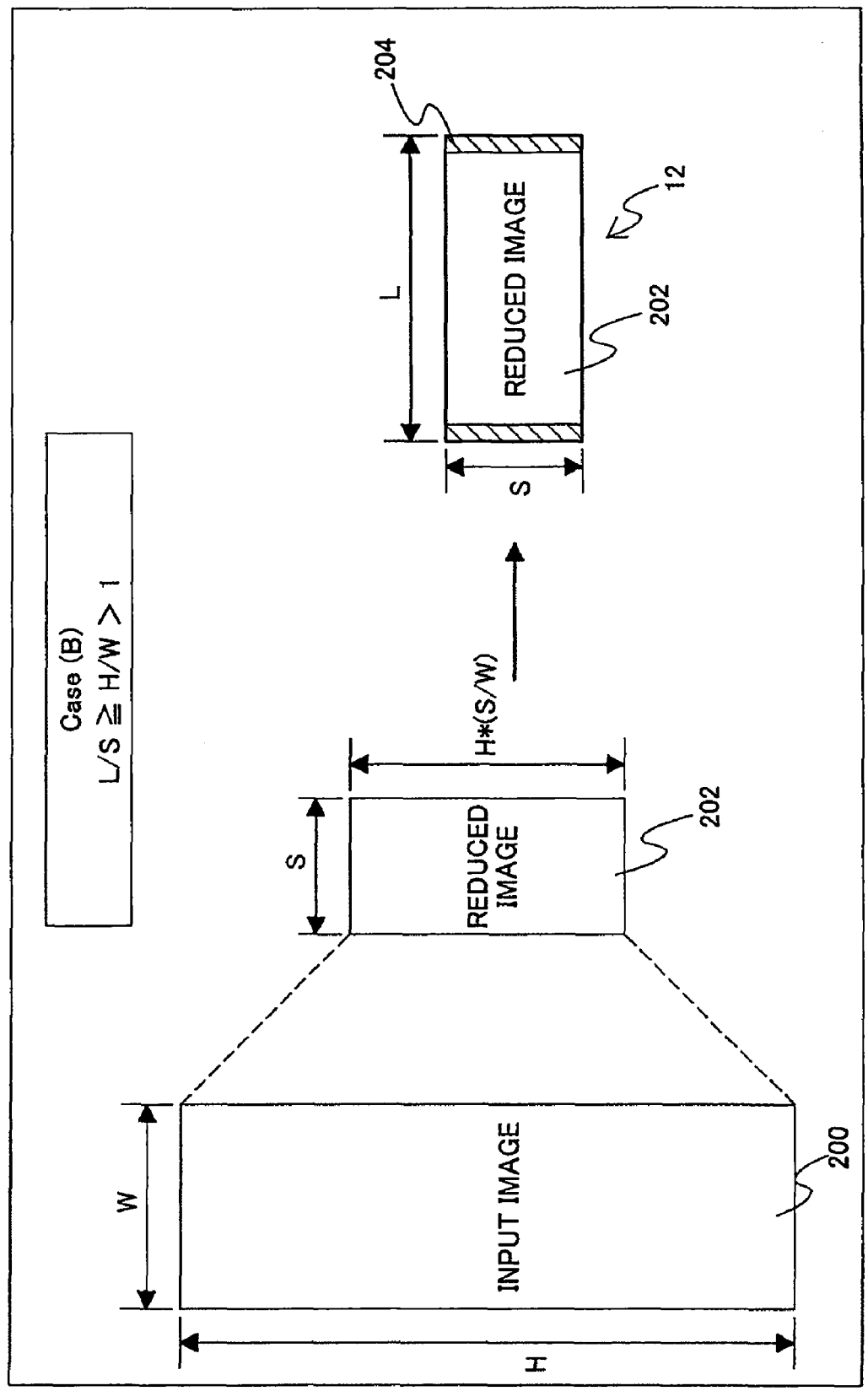
FIG. 3 illustrates an image reduction method adopted in the embodiment.

(FIG. 3: Case (B))

Next, in reference to FIG. 3, the processing executed when L/S≧H/W>1 (hereafter referred to as case (B)) is explained. FIG. 3 illustrates an image reduction method that may be adopted in case (B).

FIG. 3 shows an input image 200, a reduced image 202, the display screen 12 and non-display areas 204. The input image 200, which is the original image based upon which an image to be transferred from the information processing apparatus 100 to a terminal device 10 is generated, assumes the width W and the height H. the reduced image 202, which is the image transferred from the information processing apparatus 100 to the terminal device 10, assumes a width S and a height H*(S/W). The display screen 12, which is mounted at the terminal device 10, assumes a longer side L and a shorter side S.

Upon judging that the aspect ratio H/W of the input image 200 is greater than 1, the scaling factor setting unit 106 compares the aspect ratio H/W of the input image 200 with the aspect ratio L/S of the display screen 12. The scaling factor setting unit 106 then judges that L/S≧H/W and sets a scaling factor 'a'=S/W. Namely, the scaling factor setting unit 106 judges that the display screen 12 is more elongated than the input image 200 and sets the scaling factor 'a' in reference to the shorter side S so that the width of the reduced image 202 is set to S. The scaling factor setting unit 106 is thus able to set the height and the width of the reduced image 202 respectively to H*(S/W) and S. Subsequently, the image size adjustment unit 108 adjusts the size of the input image 200 at the scaling factor 'a' having been set by the scaling factor setting unit 106 so that the adjusted image assumes the height H*(S/W) and the width S set for the reduced image 202.

Through the processing described above, the reduced image 202 is generated in a size suitable for the display screen 12 with reduced non-display areas 204 under conditions defined as case (B). The superior effect of the processing is made very clear when compared with the processing executed as shown in FIG. 13.

Figure 4:
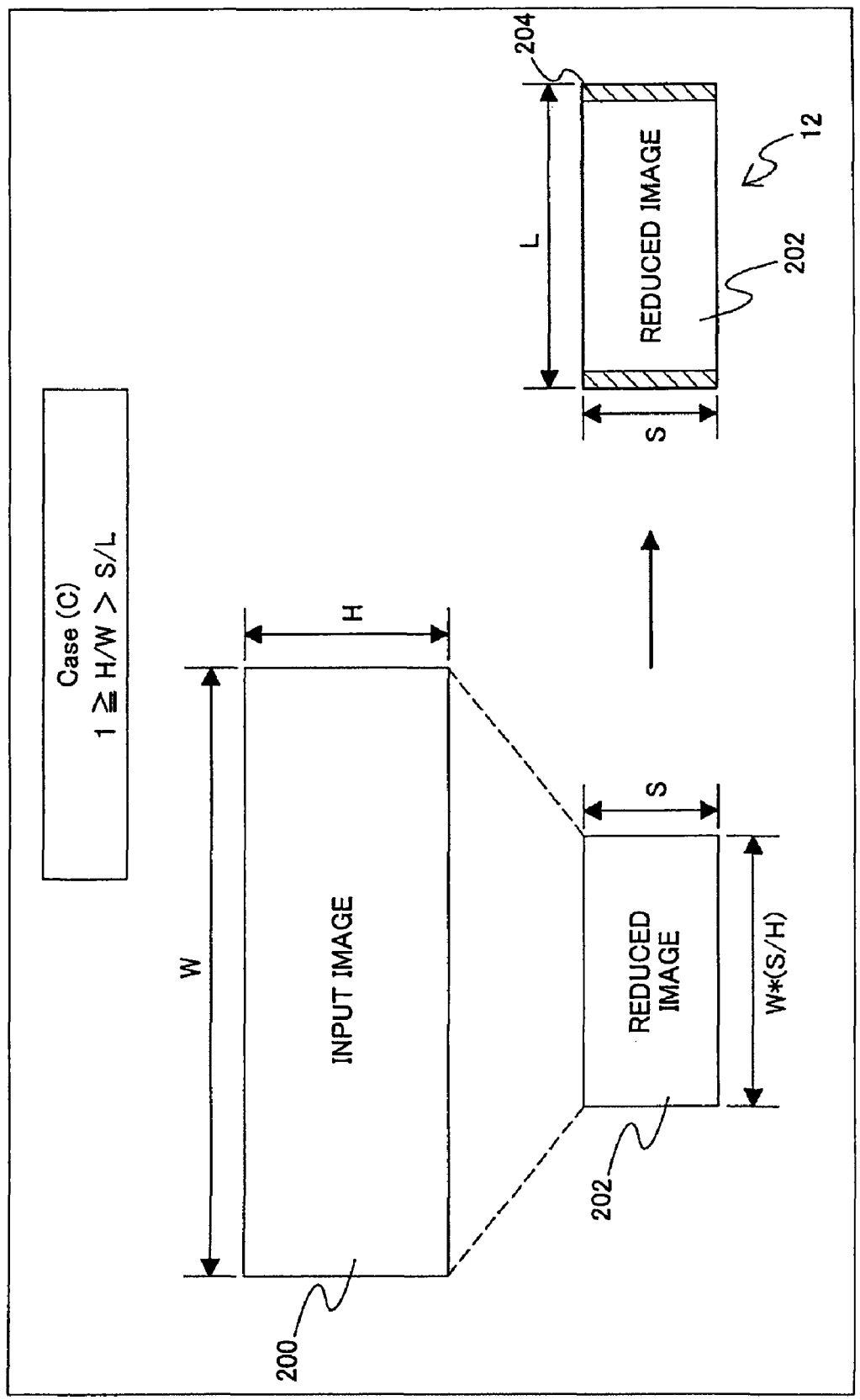
FIG. 4 illustrates an image reduction method adopted in the embodiment.

(FIG. 4: Case (C))

First, in reference to FIG. 4, the processing executed when 1≧H/W>S/L (hereafter referred to as case (C)) is explained. FIG. 4 illustrates an image reduction method that may be adopted in case (C).

FIG. 4 shows an input image 200, a reduced image 202, the display screen 12 and non-display areas 204. The input image 200, which is the original image based upon which an image to be transferred from the information processing apparatus 100 to the terminal device 10 is generated, assumes the width W and the height H. The reduced image 202, which is the image transferred from the information processing apparatus 100 to the terminal device 10, assumes a height S and a width W*(S/H). The display screen 12, which is mounted at the terminal device 10, assumes a longer side L and a shorter side S.

Upon judging that the aspect ratio H/W of the input image 200 is equal to or less than 1, the scaling factor setting unit 106 compares the aspect ratio H/W of the input image 200 with the aspect ratio S/L of the display screen 12. The scaling factor setting unit 106 then judges that H/W>S/L and sets a scaling factor 'a'=S/H. Namely, the scaling factor setting unit 106 judges that the display screen 12 is more elongated than the input image 200 and sets the scaling factor 'a' in reference to the shorter side S so that the height of the reduced image 202 is set to S. The scaling factor setting unit 106 is thus able to set the height and the width of the reduced image 202 respectively to S and W*(S/H). Subsequently, the image size adjustment unit 108 adjusts the size of the input image 200 at the scaling factor 'a' having been set by the scaling factor setting unit 106 so that the adjusted image assumes the height S and the width W*(S/H) set for the reduced image 202.

Through the processing described above, the reduced image 202 is generated in a size suitable for the display screen 12 with reduced non-display areas 204 under conditions defined as case (C). The superior effect of the processing is made very clear when compared with the processing executed as shown in FIG. 13.

Figure 5:
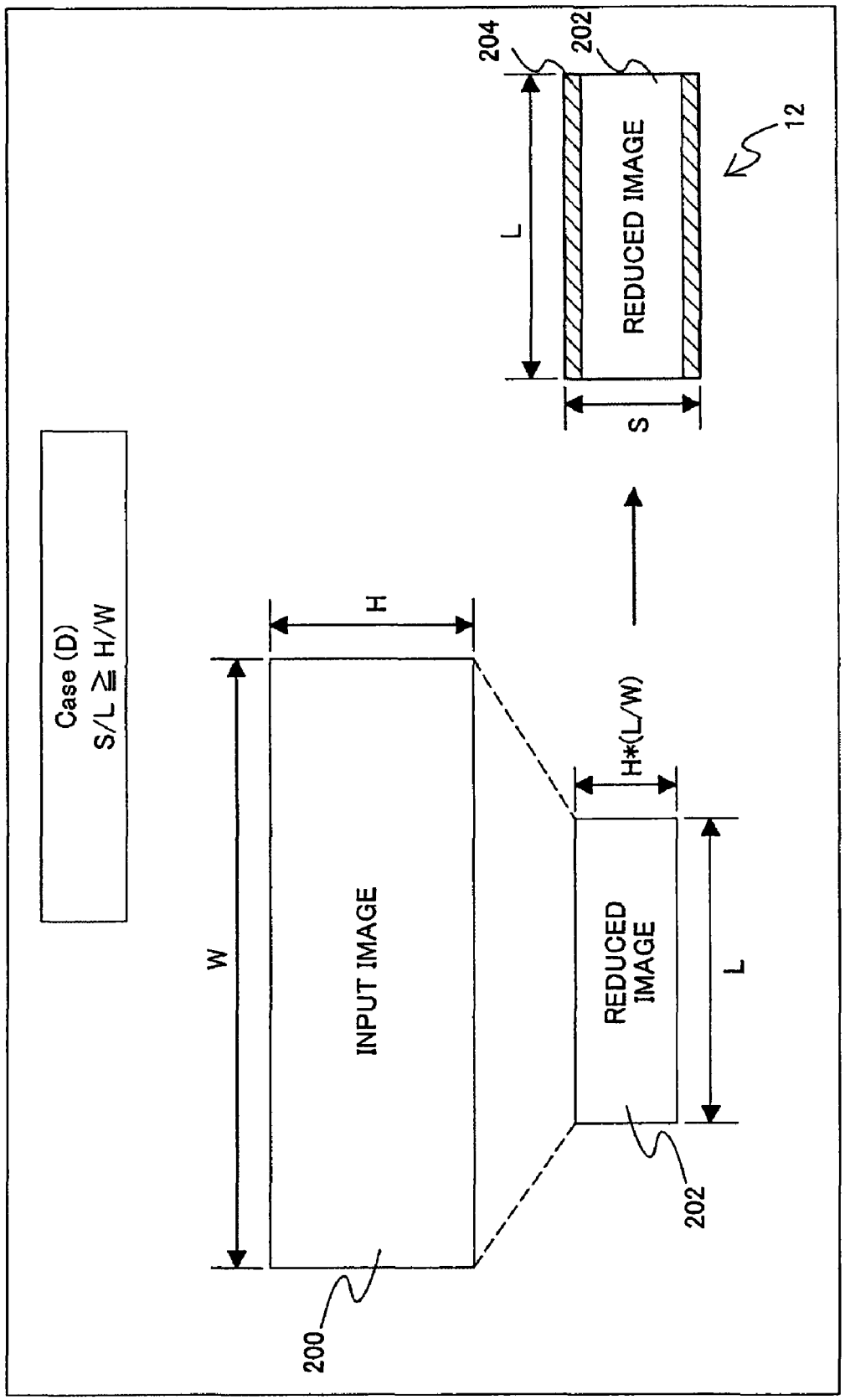
FIG. 5 illustrates an image reduction method adopted in the embodiment.

(FIG. 5: Case (D))

In reference to FIG. 5, the processing executed when S/L≧H/W (hereafter referred to as case (D)) is explained. FIG. 5 illustrates an image reduction method that may be adopted in case (D).

FIG. 5 shows an input image 200, a reduced image 202, the display screen 12 and non-display areas 204. The input image 200, which is the original image based upon which an image to be transferred from the information processing apparatus 100 to a terminal device 10 is generated, assumes the width W and the height H. The reduced image 202, which is the image transferred from the information processing apparatus 100 to the terminal device 10, assumes a width and a height H*(L/W). The display screen 12, which is mounted at the terminal device 10, assumes a longer side L and a shorter side S.

The scaling factor setting unit 106 first compares the aspect ratio H/W of the input image 200 with the aspect ratio S/L of the display screen 12. The scaling factor setting unit 106 then sets a scaling factor 'a'=L/W upon judging that S/L≧H/W. Namely, judging that the input image 200 assumes a more elongated shape than the display screen 12, the scaling factor setting unit 106 sets the scaling factor 'a' in reference to the longer side L so that the width of the reduced image 202 is set to L. The scaling factor setting unit 106 sets the height and the width of the reduced image 202 respectively to H*(L/W) and L. Subsequently, the image size adjustment unit 108 adjusts the size of the input image 200 at the scaling factor 'a' having been set by the scaling factor setting unit 106 so that the adjusted image assumes the height H*(L/W) and the width L set for the reduced image 202.

Through the processing described above, the reduced image 202 is generated in a size suitable for the display screen 12 with reduced non-display areas 204 under conditions defined as case (D). The superior effect of the processing is made very clear when compared with the processing executed as shown in FIG. 13.

Figure 6:
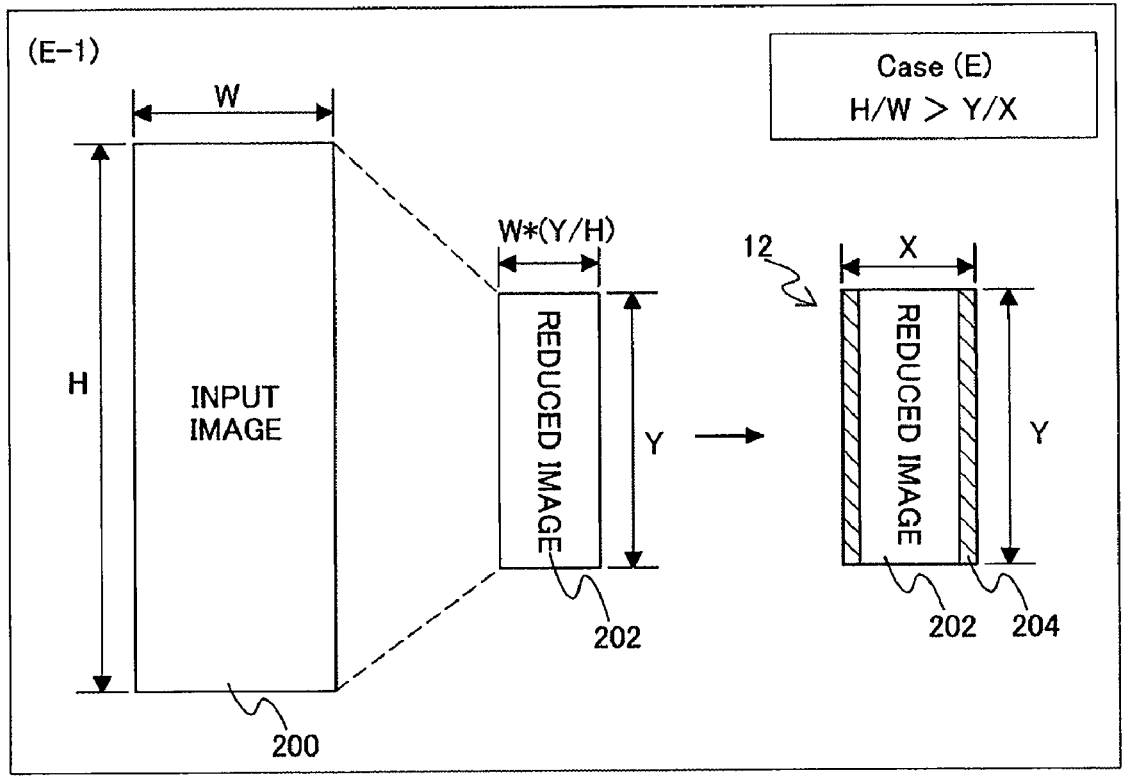
FIG. 6 illustrates an image reduction method adopted in the embodiment.

(FIG. 6 and FIG. 7: Case (E))

In reference to FIG. 6 and FIG. 7, the processing executed when H/W>Y/X (hereafter referred to as case (E)) is explained. FIG. 6 and FIG. 7 illustrate an image reduction method that may be adopted in case (E). FIG. 6 (E-1) shows a longitudinally oriented display screen 12. FIG. 7 (E-2) shows a laterally oriented display screen 12. By pre-rotating the input image 200 so as to align the direction along which the longer side of the display screen 12 extends with the direction along which the longer side of the input image 200 extends, as shown in (E-1) and (E-2), the size of the input image 200 can be adjusted to optimize the image for display at the display screen 12. It is to be noted that the rotation processing for rotating the input image 200 may be executed by, for instance, the input image setting unit 102.

FIG. 6 and FIG. 7 show an input image 200, a reduced image 202, the display screen 12 and non-display areas 204. The input image 200, which is the original image based upon which an image to be transferred from the information processing apparatus 100 to a terminal device 10 is generated, assumes the width W and the height H. The reduced image 202, which is the image transferred from the information processing apparatus 100 to the terminal device 10, assumes a width W*(Y/H) and a height Y. The display screen 12, which is mounted at the terminal device 10, assumes a width X and a height Y.

The scaling factor setting unit 106 first compares the aspect ratio H/W of the input image 200 with the aspect ratio Y/X of the display screen 12. The scaling factor setting unit 106 then sets a scaling factor 'a'=Y/H upon judging that H/W>Y/X. Namely, the scaling factor setting unit 106 sets the scaling factor 'a' in reference to the height Y so that the height of the reduced image 202 is set to Y. The scaling factor setting unit 106 sets the height and the width of the reduced image 202 respectively to Y and W*(Y/H). Subsequently, the image size adjustment unit 108 adjusts the size of the input image 200 at the scaling factor 'a' having been set by the scaling factor setting unit 106 so that the adjusted image assumes the height Y and the width W*(Y/H) set for the reduced image 202.

Through the processing described above, the reduced image 202 is generated in a size suitable for the display screen 12 with reduced non-display areas 204 under conditions defined as case (E). The superior effect of the processing is made very clear when compared with the processing executed as shown in FIG. 13.

Figure 9:
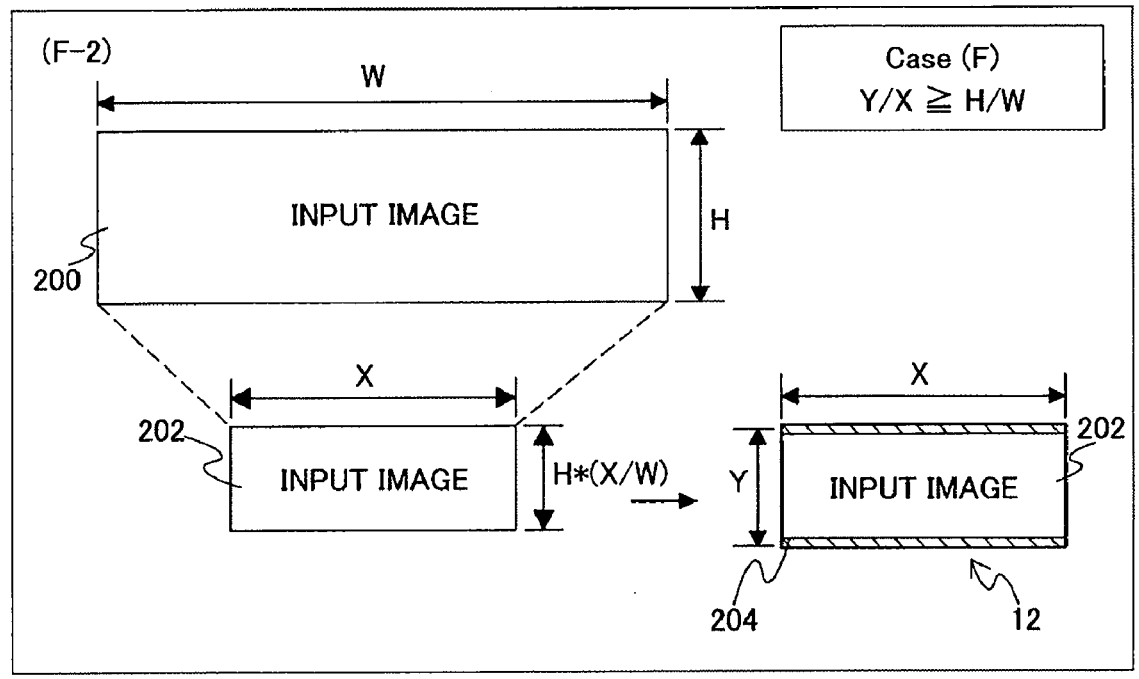
FIG. 9 illustrates an image reduction method adopted in the embodiment.

(FIG. 8 and FIG. 9: Case (F))

In reference to FIG. 8 and FIG. 9, the processing executed when Y/X≧H/W (hereafter referred to as case (F)) is explained. FIG. 8 and FIG. 9 illustrate an image reduction method that may be adopted in case (F). FIG. 8 (F-1) shows a longitudinally oriented display screen 12. FIG. 9 (F-2) shows a laterally oriented display screen 12. By pre-rotating the input image 200 so as to align the direction along which the longer side of the input image 200 extends with the direction along which the longer side of the display screen 12 extends, as shown in (F-1) and (F-2), the size of the input image 200 can be adjusted to optimize the image for display at the display screen 12. It is to be noted that the rotation processing for rotating the input image 200 may be executed by, for instance, the input image setting unit 102.

FIG. 8 and FIG. 9 show an input image 200, a reduced image 202, the display screen 12 and non-display areas 204. The input image 200, which is the original image based upon which an image to be transferred from the information processing apparatus 100 to a terminal device 10 is generated, assumes the width W and the height H. The reduced image 202, which is the image transferred from the information processing apparatus 100 to the terminal device 10, assumes a width X and a height H*(X/W). The display screen 12, which is mounted at the terminal device 10, assumes a width X and a height Y.

The scaling factor setting unit 106 first compares the aspect ratio H/W of the input image 200 with the aspect ratio Y/X of the display screen 12. The scaling factor setting unit 106 then sets a scaling factor 'a'=X/W upon judging that Y/X≧H/W. Namely, the scaling factor setting unit 106 sets the scaling factor 'a' in reference to the width X so that the width of the reduced image 202 is set to X. The scaling factor setting unit 106 sets the height and the width of the reduced image 202 respectively to H*(X/W) and X. Subsequently, the image size adjustment unit 108 adjusts the size of the input image 200 at the scaling factor 'a' having been set by the scaling factor setting unit 106 so that the adjusted image assumes the height H*(X/W) and the width X set for the reduced image 202.

Through the processing described above, the reduced image 202 is generated in a size suitable for the display screen 12 with reduced non-display areas 204 under conditions defined as case (F). The superior effect of the processing is made very clear when compared with the processing executed as shown in FIG. 13.

By adopting the technology described above in reference to the functional structure adopted in the information processing apparatus 100 in the embodiment, the input image, adjusted so as to assume an suitable size for the resolution of the display screen 12, can be transferred to the terminal device 10. As a result, the user is able to display the entire image taking up the display screen 12 to the maximum extent without having to enlarge or reduce the image at the terminal device 10.

(Image Processing Method)

Figure 10:
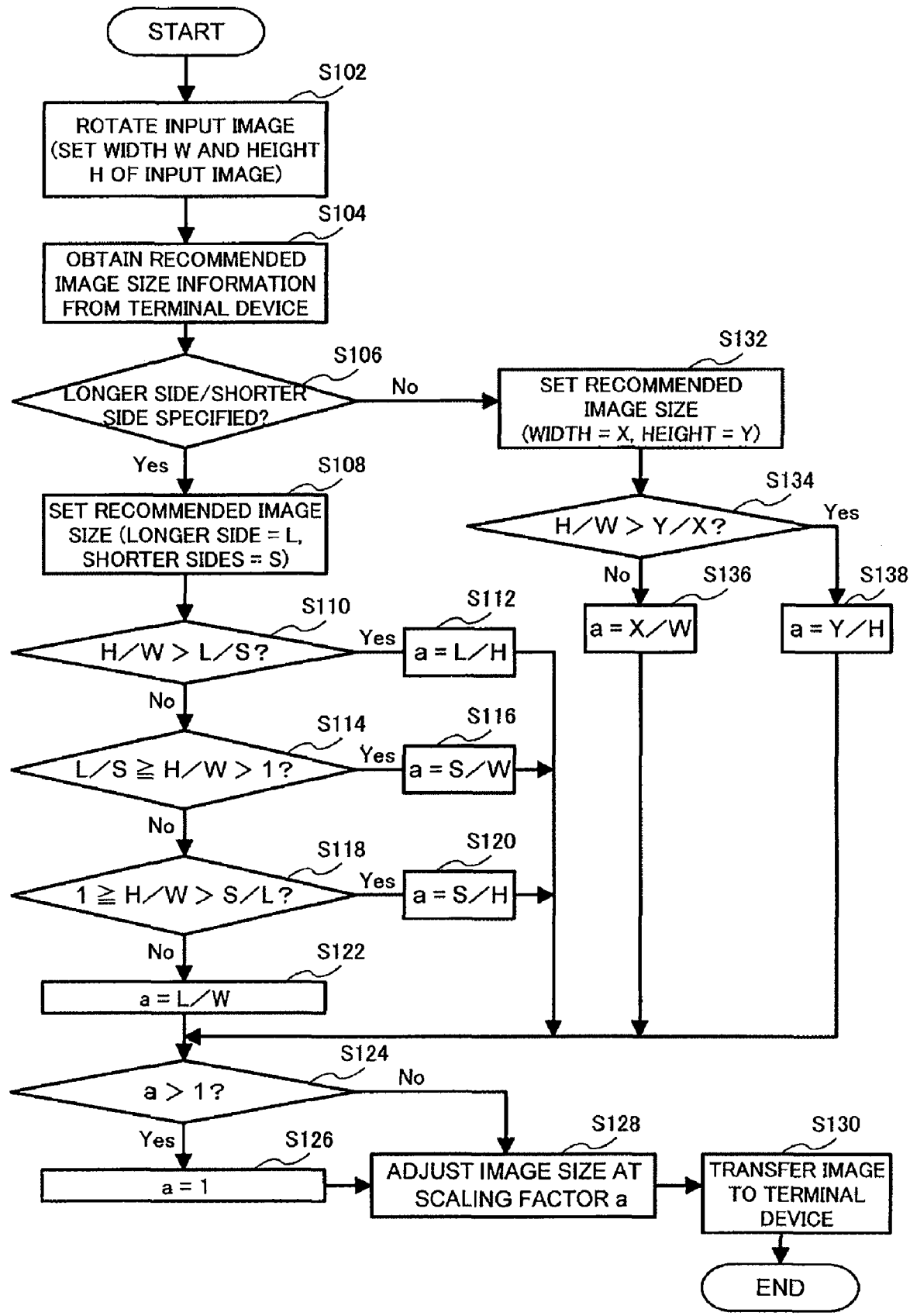
FIG. 10 presents a flowchart of the image processing executed in the embodiment.

Next, in reference to FIG. 10, the image processing method adopted in the embodiment is explained. FIG. 10 presents a flowchart of the image processing executed in the embodiment.

First, the input image setting unit 102 detects the width W and the height H of the input image and sets the detected width W and height H as information indicating the size of the input image (S102). The input image setting unit 102 is capable of rotating the input image at this time. If the input image is rotated, the input image setting unit 102 detects the width W and the height H of the rotated input image and sets the width W and the height H thus detected as the information indicating the input image size.

Next, the display information acquisition unit 104 obtains the attribute information related to the display screen 12 from the terminal device 10 (S104). The scaling factor setting unit 106 then references the attribute information having been obtained by the display information acquisition unit 104 and makes a decision as to whether or not the information related to the size of the display screen 12 includes information specifying (longer side/shorter side) (S106). In other words, the scaling factor setting unit 106 makes a decision as to whether or not the display unit 14 of the terminal device 10 has an image rotation function.

If the information related to the size of the display screen 12 includes information specifying (longer side/shorter side), the scaling factor setting unit 106 sets the measurement of the longer side L and the measurement of the shorter side S of the display screen 12 based upon the information related to the size of the display screen 12 (S108). Next, the scaling factor setting unit 106 compares the aspect ratio H/W of the input image with the aspect ratio L/S of the display screen 12 (S110). If H/W>L/S, the scaling factor setting unit 106 sets the scaling factor 'a' to L/H (S112), before the operation proceeds to step S124.

If H/W≧L/S is not true, the scaling factor setting unit 106 compares the aspect ratio H/W of the input image with the aspect ratio L/S of the display screen 12 to make a decision as to whether or not L/S≧H/W>1 is true (S114). If it is decided that L/S≧H/W>1 is true, the scaling factor setting unit 106 sets the scaling factor 'a' to S/W (S116), and then the operation proceeds to step S124.

If L/S≧H/W>1 is not true, the scaling factor setting unit 106 compares the aspect ratio H/W of the input image with the aspect ratio S/L of the display screen 12 to make a decision as to whether or not 1≧H/W>S/L is true (S118). If it is decided that 1≧H/W>S/L is true, the scaling factor setting unit 106 sets the scaling factor 'a' to S/H (S120), and then the operation proceeds to step S124.

If 1≧H/W>S/L is not true, the scaling factor setting unit 106 sets the scaling factor 'a' to L/W (S122), before the operation proceeds to step S124.

If, on the other hand, it is decided in step S106 that the information related to the size of the display screen 12 does not include information specifying (longer side/shorter side), the scaling factor setting unit 106 sets the width X and the height Y of the display screen 12 based upon the information related to the size of the display screen 12 (S132). Next, the scaling factor setting unit 106 compares the aspect ratio H/W of the input image with the aspect ratio Y/X of the display screen 12 (S134). If H/W>Y/X, the scaling factor setting unit 106 sets the scaling factor 'a' to Y/H (S138), before the operation proceeds to step S124. If H/W>Y/X is not true, the scaling factor setting unit 106 sets the scaling factor 'a' to X/W (S136) before the operation proceeds to step S124.

In step S124, the scaling factor setting unit 106 makes a decision as to whether or not the scaling factor 'a' is greater than 1 (S124). If a>1 is true, the scaling factor setting unit 106 sets the scaling factor 'a' to 1 (S126) before proceeding to step S128. Namely, if the input image is smaller in size than the display screen 12, the scaling factor setting unit 106 continues the processing by setting the scaling factor 'a' to 1 without enlarging the input image, since the input image can be enlarged at the terminal device 10. However, it will be obvious that the input image may be enlarged at the scaling factor setting unit 106. If a>1 is not true, the scaling factor setting unit 106 proceeds to step S128.

In step S128, the image size adjustment unit 108 adjusts the size of the input image at the scaling factor 'a' (S128). Subsequently, the image transfer unit 110 transfers the input image, the size of which has been adjusted, to the terminal device 10 (S130).

As explained above, the image processing method allows the size of the input image to be adjusted to the suitable size for the display screen 12 based upon the attribute information obtained from the terminal device 10. In particular, since the directionality of the input image can be substantially matched with the directionality of the display screen 12, the non-display areas can be minimized when the input image having undergone the size adjustment is brought up on display at the display screen 12. As a result, the entire input image having undergone the size adjustment can be brought up on display at the display screen 12 with resolution close to the resolution of the display screen 12.

(Example of Setting Screens)

Figure 11:
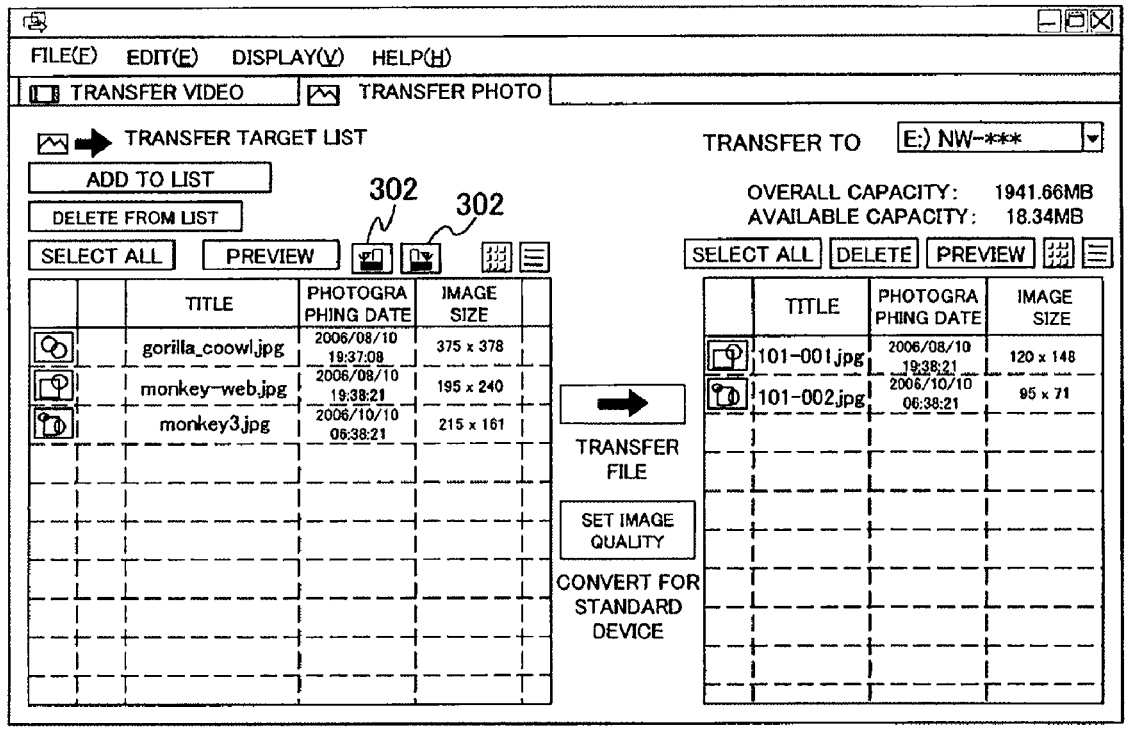
FIG. 11 shows the image transfer screen brought up on display in the embodiment.
Figure 12:
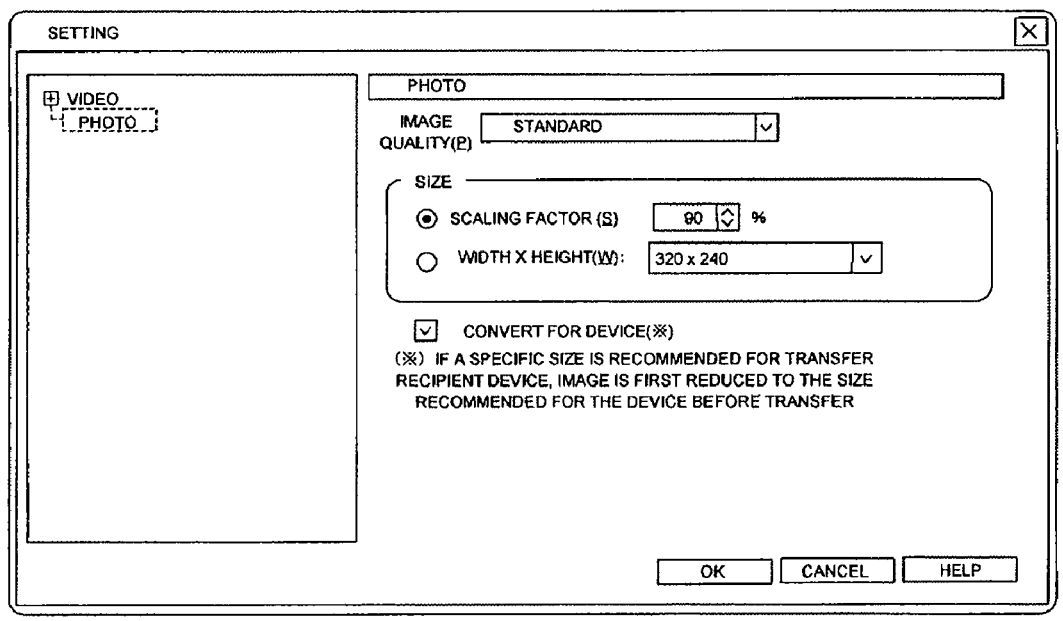
FIG. 12 shows the transfer setting screen brought up on display in the embodiment.

Lastly, in reference to FIGS. 11 and 12, specific examples of setting screens are explained. FIG. 11 shows the image transfer screen used in the embodiment, whereas FIG. 12 shows the transfer setting screen used in the embodiment.

FIG. 11 provides a schematic illustration of a user interface (UI) brought up on display at the display screen of the information processing apparatus 100. The button 302, for instance, is an execute button selected to execute the image rotation function via the input image setting unit 102. In addition, input images are listed in the list on the left side and as the file transfer button is selected, the size of the specified input image is adjusted and the adjusted image is transferred. As the image quality set button is selected, the transfer setting screen shown in FIG. 12 is brought up. A fixed size, to which the input image is to be adjusted, can be specified in this screen. In addition, the screen includes a checkbox that can be checked to automatically execute size adjustment for the input image so as to automatically reduce the input image to the suitable size for the display screen 12 at the terminal device 10 (transfer recipient device). By using a UI such as that described above, the functions of the system, the apparatus, the method and the program described above can be provided to the user in an even more user-friendly manner.

It should be understood by those skilled in the art that various modifications, combinations, sub-combinations and alterations may occur depending on design requirements and other factors insofar as they are within the scope of the appended claims or the equivalents thereof.

For instance, while an explanation is given above by assuming that the input image is rectangular, the input image may assume any shape such as a polygon or an ellipse instead of a rectangle. The width W and the height H of a polygonal or elliptical input image may be determined based upon the width and the height of a substantially rectangular frame or a substantially elliptical frame enclosing the input image or the width and height of a substantially rectangular shape or a substantially elliptical shape enclosed within the input image.

In addition, the size and the directionality of the input image may be determined by adopting any other method. In addition, while the scaling factor is set in reference to the longer side/shorter side (or the width/height) of the display screen at the terminal device in the example explained above, a recommended display size or the like for image display at the display screen may be set and the scaling factor may be set in reference to the display size, instead.

Furthermore, instead of actually rotating the input image when converting the image size, i.e., instead of altering the orientation of the original input image, information related to rotation processing may be expressed by inserting rotation information in Exif (exchangeable image file format) information and an image may be transferred simply by converting the input image size. Moreover, while display modes such as a "longitudinally oriented screen fixed mode", a "laterally oriented screen fixed mode" and an "automatic rotation mode" and the like, may be set at the terminal device, another display mode defining the directionality of the display screen based upon the shape of the display screen or the like may also be selected at the terminal device. If the display screen at the terminal device assumes a shape without any specific directionality, such as a square shape or a circular shape, information indicating whether or not the display screen has any directionality may be obtained from the terminal device and the size of the input image may be adjusted based upon the information obtained from the terminal device. In this case, since the processing is executed without having to take into consideration the directionality, the processing load is reduced.

Moreover, while an explanation is given above on an example in which the input image is reduced, the present invention may also be adopted when enlarging the input image. For instance, the present invention may be adopted when displaying an image transferred from an information processing apparatus with a large format television set, projector or the like. An advantage of outstanding visual presentation of the image through full use of the large screen is achieved by adopting the present invention in such applications.

What is claimed is:

1. An image processing system, comprising:
a terminal device equipped with a display screen at which an image is displayed; and
an information processing apparatus configured to communicate with the terminal device and configured to transfer an input image after adjusting the size thereof so as to optimize the input image for the display screen at the terminal device, wherein:
the terminal device includes:
a transfer unit to transfer to the information processing apparatus attribute information including information indicating a directionality of the display screen, information related to the size of the display screen and information related to availability of an image rotation function of the terminal device, and
the information processing apparatus includes:
an acquisition unit to obtain the attribute information from the terminal device;
a detection unit to detect the size of the input image,
an adjustment unit to determine, based on the attribute information, whether the terminal device has the image rotation function, and to adjust, when the adjustment unit determines that the terminal device has the image rotation function, the size of the input image so as to align the direction along which a longer side of the input image extends with the direction along which a longer side of the display screen extends based upon the information indicating the directionality and size of the display screen included in the attribute information, the adjustment unit adjusting the size of the input image further based on a comparison between an aspect ratio of the display screen and an aspect ratio of the input image while maintaining the aspect ratio of the input image, and
a second transfer unit that transfers the input image with the adjusted size to the terminal device, wherein
upon determination that the aspect ratio of the input image is greater than the aspect ratio of the display screen, the input image is adjusted according to a first scaling factor set to the longer side of the display screen divided by a longer one of a height and a width of the input image, and
upon determination that the aspect ratio of the display screen is greater than or equal to the aspect ratio of the input image, the input image is adjusted according to a second scaling factor set to a shorter side of the display screen divided by a shorter one of the height and the width of the input image, and further wherein
when the adjustment unit does not determine that the terminal device has the image rotation function, the adjustment unit rotates the input image and adjusts the size of the input image based on a height and a width of the display screen determined from the attribute information and the height and the width of the input image.

2. An information processing apparatus, comprising:
an acquisition unit to obtain from a terminal device equipped with a display screen attribute information including information indicating a directionality and size of the display screen, and availability of an image rotation function of the terminal device;
a detection unit to detect the size of an input image;
an adjustment unit to determine, based on the attribute information, whether the terminal device has the image rotation function, and to adjust, when the adjustment unit determines that the terminal device has the image rotation function, the size of the input image so as to align the direction along which a longer side of the input image extends with the direction along which a longer side of the display screen extends based upon the information indicating the directionality and size of the display screen included in the attribute information, the adjustment unit adjusting the size of the input image further based on a comparison between an aspect ratio of the display screen and an aspect ratio of the input image while maintaining the aspect ratio of the input image; and
a transfer unit that transfers the input image with the adjusted size to the terminal device, wherein
upon determination that the aspect ratio of the input image is greater than the aspect ratio of the display screen, the input image is adjusted according to a first scaling factor set to the longer side of the display screen divided by a longer one of a height and a width of the input image, and
upon determination that the aspect ratio of the display screen is greater than or equal to the aspect ratio of the input image, the input image is adjusted according to a second scaling factor set to a shorter side of the display screen divided by a shorter one of the height and the width of the input image, and further wherein
when the adjustment unit does not determine that the terminal device has the image rotation function, the adjustment unit rotates the input image and adjusts the size of the input image based on a height and a width of the display screen determined from the attribute information and the height and the width of the input image.

3. The information processing apparatus according to claim 2, wherein:
when the adjustment unit determines that the terminal device has the image rotation function, the adjustment unit adjusts a measurement of the longer side or a shorter side of the input image in conformance to the longer side or the shorter side of the display screen so as to display the entire input image in the display screen.

4. The information processing apparatus according to claim 2, wherein:
when the adjustment unit does not determine that the terminal device has the image rotation function, the adjustment unit adjusts the size of the input image so that the orientation of the display screen and the orientation of the input image match.

5. The information processing apparatus according to claim 2, wherein:
the acquisition unit obtains information indicating a display mode selected at the terminal device as the attribute information; and
the adjustment unit adjusts the size of the input image based upon the information indicating the display mode.

6. The information processing apparatus according to claim 2, wherein:
the transfer unit also transfers to the terminal device information indicating the orientation of the input image with the adjusted size.

7. An image processing method adopted in an information processing apparatus, comprising:
acquiring attribute information including information indicating a directionality and size of a display screen and availability of an image rotation function of a terminal device from the terminal device equipped with the display screen;
detecting the size of a input image;
determining, based on the attribute information, whether the terminal device has the image rotation function;
adjusting, when the terminal device is determined to have the image rotation function, the size of the input image so as to align the direction along which a longer side of the input image extends with the direction along which a longer side of the display screen extends based upon the information indicating the directionality and size of the display screen included in the attribute information, the adjusting of the size of the input image being further based on a comparison between an aspect ratio of the display screen and an aspect ratio of the input image while maintaining the aspect ratio of the input image; and
transferring the input image with the adjusted size to the terminal device, wherein
upon determination that the aspect ratio of the input image is greater than the aspect ratio of the display screen, the input image is adjusted according to a first scaling factor set to the longer side of the display screen divided by a longer one of a height and a width of the input image, and
upon determination that the aspect ratio of the display screen is greater than or equal to the aspect ratio of the input image, the input image is adjusted according to a second scaling factor set to a shorter side of the display screen divided by a shorter one of the height and the width of the input image, and further wherein
when the terminal device is not determined to have the image rotation function, the adjusting rotates the input image and adjusts the size of the input image based on a height and a width of the display screen determined from the attribute information and the height and the width of the input image.

8. The image processing method according to claim 7, wherein:
in the adjusting, when the terminal device is determined to have the image rotation function, a measurement of the input image along the longer side or a shorter side of the input image is adjusted in conformance to the longer side or the shorter side of the display screen so that the entire input image is displayed in the display screen.

9. The image processing method according to claim 7, wherein:
when the terminal device is not determined to have the image rotation function, the size of the input image is adjusted so that the orientation of the display screen and an orientation of the input image match in the adjusting.

10. The image processing method according to claim 7, wherein:
in the acquiring, information indicating a display mode selected at the terminal device is acquired as the attribute information; and
in the adjusting, the size of the input image is adjusted based upon the information indicating the display mode.

11. The image processing method according to claim 7, wherein:
in the transferring, information indicating an orientation of the input image with the adjusted size is also transferred to the terminal device.

12. A non-transitory computer readable media having stored thereon computer executable instructions, which when executed by a processor, causes the processor to perform:
an acquisition function of obtaining attribute information including information indicating a directionality and size of a display screen and availability of an image rotation function of a terminal device from the terminal device equipped with the display screen;
a detection function of detecting the size of an input image;
an adjustment function of determining, based on the attribute information, whether the terminal device has the image rotation function, and adjusting, when the terminal device is determined to have the image rotation function, the size of the input image so as to align the direction along which a longer side of the input image extends with the direction along which a longer side of the display screen extends based upon the information indicating the directionality and size of the display screen included in the attribute information, the adjustment function being further based on a comparison between an aspect ratio of the display screen and an aspect ratio of the input image while maintaining the aspect ratio of the input image; and
a transfer function of transferring the input image with the adjusted size to the terminal device, wherein
upon determination that the aspect ratio of the input image is greater than the aspect ratio of the display screen, the input image is adjusted according to a first scaling factor set to the longer side of the display screen divided by a longer one of a height and a width of the input image, and
upon determination that the aspect ratio of the display screen is greater than or equal to the aspect ratio of the input image, the input image is adjusted according to a second scaling factor set to a shorter side of the display screen divided by a shorter one of the height and the width of the input image, and further wherein
when the terminal device is not determined to have the image rotation function, the adjusting rotates the input image and adjusts the size of the input image based on a height and a width of the display screen determined from the attribute information and the height and the width of the input image.

13. The non-transitory computer readable media according to claim 12, wherein:

through the adjustment function, when the terminal device is determined to have the image rotation function, a measurement of the input image along the longer side or a shorter side of the input image is adjusted in conformance to the longer side or the shorter side of the display screen so that the entire input image is displayed in the display screen.

14. The non-transitory computer readable media according to claim 12, wherein:

when the terminal device is not determined to have the image rotation function, the size of the input image is adjusted so that the orientation of the display screen and an orientation of the input image match through the adjustment function.

15. The non-transitory computer readable media according to claim 12, wherein:

through the acquisition function, information indicating a display mode selected at the terminal device is obtained as the attribute information, and through the adjustment function, the size of the input image is adjusted based upon the information indicating the display mode.

16. The non-transitory computer readable media according to claim 12, wherein:

through the transfer function, information indicating an orientation of the input image with the adjusted size is also transferred to the terminal device.

* * * * *